United States Patent [19]

Newton, Jr.

[11] Patent Number: 5,135,061
[45] Date of Patent: Aug. 4, 1992

[54] CUTTING ELEMENTS FOR ROTARY DRILL BITS

[76] Inventor: Thomas A. Newton, Jr., 13711 Cricket Hollow, Houston, Tex. 77069

[21] Appl. No.: 562,115

[22] Filed: Aug. 3, 1990

[30] Foreign Application Priority Data

Aug. 4, 1989 [GB] United Kingdom ............... 8917878

[51] Int. Cl.⁵ .............................................. E21B 10/46
[52] U.S. Cl. ...................... 175/428; 175/379; 175/426; 407/119
[58] Field of Search ............... 175/329, 410, 379, 307; 51/297; 407/118, 119

[56] References Cited

U.S. PATENT DOCUMENTS

| Re. 32,036 | 11/1985 | Dennis | 175/329 |
|---|---|---|---|
| 2,842,342 | 7/1958 | Haglund | |
| 2,888,247 | 5/1959 | Haglund | |
| 2,889,138 | 6/1959 | Haglund | |
| 3,311,181 | 3/1967 | Fowler | 175/410 |
| 3,344,496 | 10/1967 | Patkay | 407/119 X |
| 3,850,591 | 11/1974 | Wentorf, Jr. | 51/307 |
| 4,151,686 | 5/1979 | Lee et al. | 51/307 |
| 4,168,957 | 9/1979 | Lee et al. | 51/309 |
| 4,219,339 | 8/1990 | Wilson | 51/297 X |
| 4,224,380 | 9/1980 | Bovenkerk | 428/545 |
| 4,229,186 | 10/1980 | Wilson | 51/297 |
| 4,255,165 | 3/1981 | Dennis et al. | 175/329 X |
| 4,259,090 | 3/1981 | Bovenkerk | 51/309 |
| 4,311,490 | 1/1982 | Bovenkerk et al. | 51/307 |
| 4,440,573 | 4/1984 | Ishizuka | 75/243 |
| 4,484,644 | 11/1984 | Cook et al. | 175/410 |
| 4,505,342 | 3/1985 | Barr et al. | 175/329 |
| 4,511,006 | 4/1985 | Grainger | 175/57 |
| 4,518,659 | 5/1985 | Gigl et al. | 428/539.5 |
| 4,525,178 | 6/1985 | Hall | 51/309 |
| 4,525,179 | 6/1985 | Gigl | 51/309 |
| 4,605,343 | 8/1986 | Hibbs, Jr. et al. | 175/329 X |
| 4,686,080 | 8/1987 | Hara et al. | 175/329 X |
| 4,694,918 | 9/1987 | Hall | 175/329 |
| 4,861,350 | 8/1989 | Phaal et al. | 175/329 X |

FOREIGN PATENT DOCUMENTS

| 0626345 | 8/1961 | Canada | 175/410 |
|---|---|---|---|
| 0154936 | 3/1985 | European Pat. Off. | |
| 272913 | 6/1988 | European Pat. Off. | 51/297 |
| 530834 | 1/1973 | Switzerland | |
| 0632823 | 11/1978 | U.S.S.R. | 175/329 |
| 1086110 | 4/1984 | U.S.S.R. | 175/329 |
| 2216929 | 10/1989 | United Kingdom | 175/329 |

Primary Examiner—Hoang C. Dang
Attorney, Agent, or Firm—Browning, Bushman, Anderson & Brookhart

[57] ABSTRACT

A preform cutting element for a rotary drill bit for use in drilling or coring holes in subsurface formations includes a cutting table 12, 13 of superhard material such as polycrystalline diamond. The rear face of the cutting table is bonded to a substrate 11 of less hard material, such as cemented tungsten carbide. A front portion 12 of the cutting table comprises a form of superhard material which is less wear-resistant than the superhard material forming the remainder 13 of the cutting table. The provision of the less wear-resistant superhard material at the front cutting faces reduces the tendency of the cutting table to spall.

8 Claims, 2 Drawing Sheets

CUTTING ELEMENTS FOR ROTARY DRILL BITS

BACKGROUND OF THE INVENTION

The invention relates to cutting elements for rotary drill bits for use in drilling or coring holes in subsurface formations.

In particular, the invention is applicable to cutting elements for use on rotary drill bits of the kind comprising a bit body having a shank for connection to a drill string and an inner passage for supplying drilling fluid to the face of the bit, the bit body carrying a plurality of cutting elements. Each cutting element comprises a preform element, often in the form of a circular tablet, including a cutting table of superhard material having a front cutting face and a rear face, the rear face of the cutting table being bonded to a substrate of material which is less hard than the superhard material.

The cutting table, which is normally in the form of a single layer, usually comprises polycrystalline diamond, although other superhard materials are available, such as cubic boron nitride. The substrate of less hard material is often formed from cemented tungsten carbide, and the cutting table and substrate are bonded together during formation of the cutting element in a high pressure, high temperature forming press.

Since the substrate is of less hard material than the cutting table, the two-part arrangement of the cutting element provides a degree of self-sharpening since, in use, the less hard substrate wears away more easily than the harder cutting table.

The perform cutting element may be directly mounted on the bit body or may be bonded to a carrier, for example also of cemented tungsten carbide, the carrier being in turn received in a socket in the bit body. The bit body may be machined from metal, usually steel, or may be formed from an infiltrated tungsten carbide matrix by a powder metallurgy process.

Such cutting elements are subjected to extremes of temperature and heavy loads, including impact loads, when the drill is in use down a borehole. It is found that under drilling conditions spalling of the diamond table can occur, that is to say the separation and loss of diamond material over the cutting surface of the table. Such spalling usually spreads from the cutting edge, probably as a result of impact forces. The spalling reduces the cutting efficiency of the element, and in severe cases can lead to delamination, that is to say separation of the diamond table from the substrate.

It has been found that the incidence of spalling may be reduced by pre-bevelling the periphery of the diamond table. Reference in this regard may be made to U.S. Pat. No. Re. 32036. However, the pre-bevelling process is comparatively costly and time consuming, involving as it does the cutting or grinding of a significant amount of the superhard material from the periphery of the diamond table. Also, the pre-formed bevel becomes worn away after an initial period of use and the anti-spalling advantage it gives therefore also disappears after such period.

The present invention sets out to provide an alternative and advantageous method of forming the cutting table of superhard material in a cutting element in a manner to inhibit spalling.

SUMMARY OF THE INVENTION

According to the invention there is provided a perform cutting element including a cutting table of superhard material having a front cutting face and a rear face, the rear face of the cutting table being bonded to a substrate of material which is less hard than the superhard material, wherein the cutting table includes a front portion which provides said cutting face and comprises a form of superhard material which is less wear-resistant than the superhard material forming at least one other portion of the remainder of the cutting table.

As superhard material is made less wear-resistant it becomes more resistant to spalling and the formation of the front cutting portion of the cutting table from a less wear-resistant material thus reduces its tendency to spall. At the same time, however, the inclusion in the cutting table of a more wear-resistant form of superhard material, behind the cutting face, ensures that the cutting table as a whole still operates efficiently and does not wear away too quickly.

The invention may therefore be regarded, in some of its aspects, as comprising the addition to a conventional two-part preform cutting element of a further front layer of superhard material which is less wear-resistant than the superhard material used for the remainder of the cutting table.

The cutting table may comprise at least two distinct layers of superhard material bonded together and including a front layer which provides said cutting face and a second layer behind said front layer, the front layer comprising the form of superhard material which is less wear-resistant than the superhard material forming the second layer.

In such an arrangement the distinct front and second layers may constitute the whole of the cutting table. Alternatively there may be provided a third layer of superhard material behind the second layer and bonded thereto. In this case the third layer may also comprise a form of superhard material which is less wear-resistant than the superhard material forming the second layer. For example it may be of the same composition as the front layer.

In the latter arrangement the presence of the third layer, being less wear-resistant than the second layer, enhances the self-sharpening property of the cutting element, since in use it wears away, rearwardly of the second layer, at a rate intermediate of the rate of wear of the second layer and the substrate.

In addition, the third layer may act as a transition layer between the second layer and the substrate in a manner to facilitate manufacture of the cutting element. For example, the third layer, as well as being less wear-resistant, may have a coefficient of thermal expansion and modulus of elasticity intermediate those of the second layer and the substrate. This may enhance the bonding between the cutting table and the substrate and reduce the stresses incorporated in the cutting element in the region of the bond during its formation.

Such transition layers have been employed in the construction of inserts for roller cone bits, as described in U.S. Pat. No. 4694918. In the arrangements described in that specification, however, the front, outermost layer is always the hardest layer, and there is no disclosure of the concept of the present invention where the front layer is less wear-resistant than one or more layers inwardly thereof. The transition layer is also not used for the purpose of enhancing self-sharpening since the inserts of a roller cone bit operate by impact crushing the formation and do not provide a cutting edge in the manner of cutting elements for a drag bit. It will be apparent that transition layers, for example as described in U.S. Pat. No. 4694918, may be employed in any of the arrangements according to the present invention.

Instead of the provision of a single third layer, of less wear-resistance, behind the second layer, as described above, the cutting table may include a plurality of further layers stacked behind the second layer, the further layers being of decreasing wear-resistance as they extend away from the second layer towards the substrate. By providing a plurality of further layers of decreasing wear-resistance, the rate at which the layers are worn away, in use, increases towards the less hard substrate and this enhances the self-sharpening effect.

In an alternative arrangement according to the present invention, the aforesaid third layer may be formed of a superhard material which is more wear-resistant still than the second layer. In a development of such arrangement there may be provided a plurality of layers stacked behind the second layer, the further layers being formed of increasingly wear-resistant superhard material as they extend away from the second layer.

Instead of the superhard cutting table comprising two or more distinct layers bonded together, it may comprise a single layer, the composition of the single cutting layer varying throughout its thickness in a manner so as to provide said front portion which is less wear-resistant than at least one other portion of the remainder of the single layer.

Various means may be employed to render the different portions or layers of the cutting table of different wear-resistance. For example, in the case where the cutting table is formed of polycrystalline diamond, the front portion or front layer of the cutting table may be rendered less wear-resistant by being formed of diamond particles which are, on average, of larger grain size than the diamond particles forming said other portion of the cutting table.

Alternatively or additionally, the front portion of the front layer may be rendered less wear-resistant by being formed of diamond particles of lower packing density than the diamond particles forming said other portion of the cutting table.

In a further alternative, the front portion or front layer of the superhard cutting table may comprise polycrystalline diamond material which is rendered less wear-resistant by the inclusion of an additive material prior to formation of the cutting element in the press. The additive material may, for example, be tungsten carbide particles or pre-cemented particles of tungsten carbide.

The formation of a superhard composite by combining polycrystalline diamond particles with pre-cemented tungsten carbide particles is disclosed in U.S. Pat. No. 4,525,178.

DETAILED DESCRIPTION OF THE PREFERRED EMBODIMENTS

Figure 1:
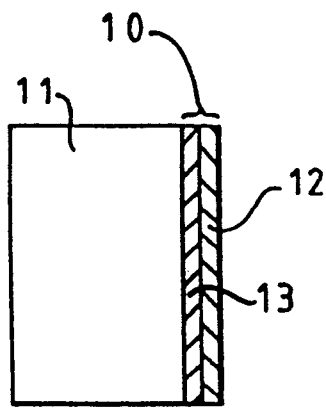
FIG. 1 is a diagrammatic, longitudinal, cross-sectional view through a cutting element in accord with a first embodiment of the invention.

Referring to FIG. 1, the cutting element, which is generally in the form of a circular tablet, comprises a front cutting table 10 of superhard material bonded to a thicker substrate 11 of less hard material, such as cemented tungsten carbide. As is well known, the components of the cutting element are bonded together during formation of the whole cutting element in a high pressure, high temperature forming press.

Usually, in cutting elements of this type, the front cutting table 10 comprises a single layer of polycrystalline diamond of substantially uniform composition. (The use in the specification of the description "substantially uniform" does not imply that the layer is formed of particles of substantially uniform size. In any part of the layer there will normally be particles of a range of sizes and other particles may be present in addition to the diamond particles. The description "substantially uniform" therefore means that the proportions of the particles of different sizes and/or compositions is approximately the same in all parts of the layer). The composition of the diamond making up the single layer is selected to provide a high degree of wear-resistance so as to provide the desired cutting efficiency and life of the cutting element in use on the drill bit.

FIG. 1, however, shows a cutting element in accordance with the present invention where the front cutting table 10 comprises two layers 12 and 13 of different compositions. The material forming the front layer 12 is less wear-resistant than the material forming the second layer 13, and as previously described it is found that this may inhibit spalling of the front cutting surface.

Various methods may be used to achieve the desired difference in wear-resistance of the two layers. For example, the wear-resistance of polycrystalline diamond material may be varied by varying the grain size of the diamond particles used in the formation of the layer. A smaller maximum or average particle size in a diamond layer will result in greater wear-resistance than a larger maximum or average particle size. Thus, to provide the effect required by the invention the front layer 12 may have a larger maximum or average particle size than the layer 13.

In addition to, or instead of, varying the wear-resistance by varying the grain size, the wear-resistance may also be varied by varying the grain size distribution or packing density of the diamond particles. Thus, a mix having an appropriate range of different particle sizes will usually provide a higher packing density, and thus greater wear-resistance, than a mix of comparatively uniformly sized particles, since the small particles will fill the voids between the larger particles in the former (relatively non-uniform) mix. Accordingly, the variation in wear-resistance required by the invention may be achieved by forming the front layer 12 from diamond particles providing a lower packing density than the particles used for the layer 13. Due to the effect of pressure on packing density, during formation of a layer, it may be necessary to form the layers during separate pressings rather than simultaneously.

In a further alternative method of varying the wear-resistance of the layers, this may be achieved by including with the diamond particles, before they are introduced into the forming press, an additive which alters the final wear-resistance. Such an additive may comprise, for example, particles of tungsten carbide or pre-cemented particles of tungsten carbide, mixed with the diamond particles. The front layer 12 will thus contain a higher proportion of the additive than the second sub-layer 13, which may have no additive at all.

The necessary properties of the additive are that it must be bondable to diamond and must be able to withstand the temperature and pressure to which it must be subjected in the press during the initial formation of the cutting element. It should also have a high Young's modulus and fairly high strength and a low coefficient of thermal expansion. Other suitable additives may be metallic tungsten or other refractory metal, or a ceramic such as boron carbide, silicon carbide, tantalum carbide, titanium carbide, titanium nitride, boron nitride, or titanium boride.

Figure 2:
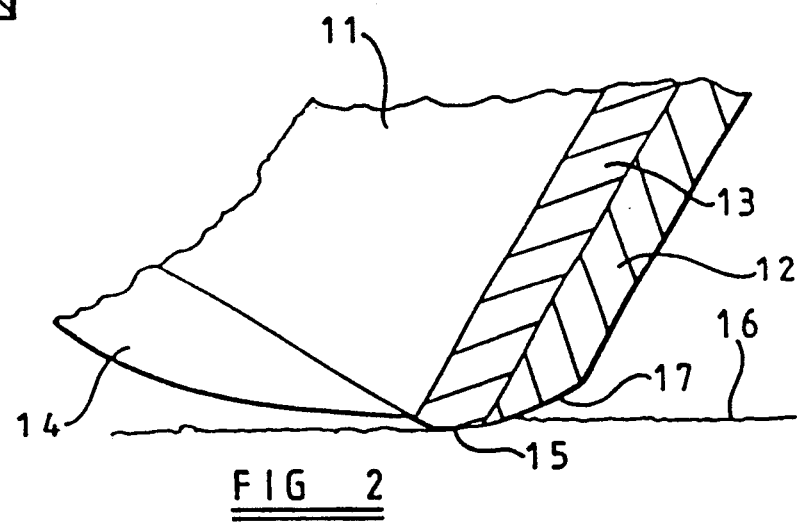
FIG. 2 is an enlarged detailed view of the embodiment of FIG. 1 after being partially worn through use.

FIG. 2 is an enlarged view, in the region of the cutting edge, of a cutting element according to FIG. 1 after an initial period of wear when it is mounted and in use on a drill bit, the bit body being indicated 14. It will be seen that an angled wear flat 15 becomes formed on the cutting edge. Where the wear flat 15 occurs on the harder layer 13, the wear flat is generally parallel to the surface of the formation 16 and is thus determined by the rake angle of the cutting element. However, due to the lower wear-resistance of the front layer 12 there is greater wear of this layer in the region of the cutting edge as indicated at 17. It will be seen that this provides a rounded edge to the cutting element where it engages the formation. As previously mentioned, it has been found that the incidence of spalling can be reduced by pre-bevelling the periphery of the diamond cutting table, and the rounding of the cutting edge achieved by the present invention has a similar anti-spalling effect. Accordingly, in addition to the two-layer form of cutting table per se reducing the tendency to spall, the present invention also results, after a period of use, in a structural shape of a kind which has been found further to reduce the tendency to spall.

It should be mentioned that some slight rounding of the cutting edge of the diamond layer will normally occur, with wear, in a conventional preform cutting element. However, this slight rounding is normally insufficient to inhibit spalling, whereas the present invention increases the extent of rounding to a point where an anti-spalling effect is achieved.

The arrangement according to the invention has advantage over the pre-bevelled arrangement referred to earlier and described in U.S. Pat. No. 32036. In the known arrangement, in order to provide the anti-spalling effect, the pre-bevelling must be at such an angle that the bevelled surface is inclined away from the surface of the formation when the cutting element is mounted at the required rake angle. However, this pre-bevelled edge wears away during use of the cutting element, so that eventually a point is reached when all the bevel has worn away. The wear flat, where it extends across the single layer of the cutting table, is then substantially parallel to the surface of the formation, due to the cutting table being of substantially uniform composition. When this point is reached, and the bevel has been worn away, the cutting element obviously has no more resistance to spalling than a similarly worn conventional non-pre-bevelled cutting element.

In the arrangement according to the present invention, however, the rounded portion 17, extending away from the surface of the formation, is constantly renewed and persists during the whole life of the cutting element, and thus tends to inhibit spalling during the whole life of such element. Similar modifications can be made to other embodiments of the invention.

Figure 3:
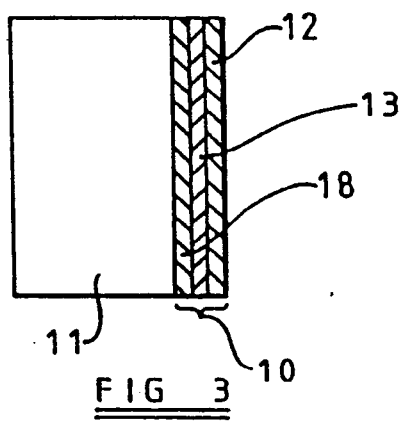
FIG. 3 is a view similar to that of FIG. 1 showing a second embodiment of the invention.

FIG. 3 shows an alternative arrangement where a third diamond layer 18 is provided between the second layer 13 and the substrate 11. The third layer 18 is of less wear-resistance than layer 13, for example it may be of similar composition and hence wear-resistance to the front layer 12. Since the third layer 18 is less wear-resistance than the layer 13 it wears away, in use, more rapidly than the layer 13. It therefore contributes to the desirable self-sharpening effect referred to previously by allowing part of the superhard cutting table itself, as well as the substrate 14, to be worn away at a greater rate than the layer 13 of the cutting table.

The less wear-resistant layer 18 may also act as a transition layer, as previously described, to improve the bonding between the substrate and the cutting table.

Figure 4:
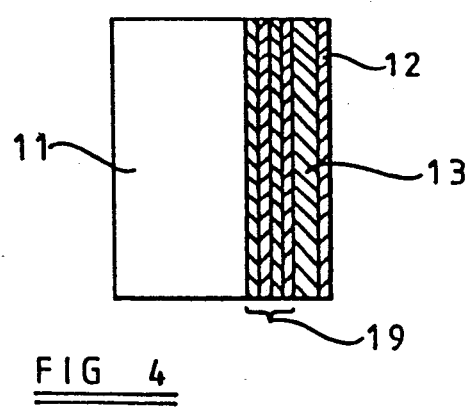
FIG. 4 is a view similar to that of FIG. 1 showing a third embodiment of the invention.

FIG. 4 shows a modification of the arrangement of FIG. 3 in which there are provided a plurality of further layers behind the second layer 13, the further layers being indicated at 19. Any required number of further layers 19 may be provided and their wear-resistance is preferably graded, using any of the methods referred to earlier, so that the layers 19 becomes less hard and wear-resistant as they extend from the layer 13 towards the substrate 11. As in the previous arrangement the layers 19 may also act as multiple transition layers in the manner of U.S. Pat. No. 4,694,918.

In the arrangement of FIG. 4, the single less wear-resistant layer 12 in front of the layer 13 may be replaced by two layers of less wear-resistance than the layer 13, the outermost of the two layers being less wear-resistant than the next layer.

Figure 5:
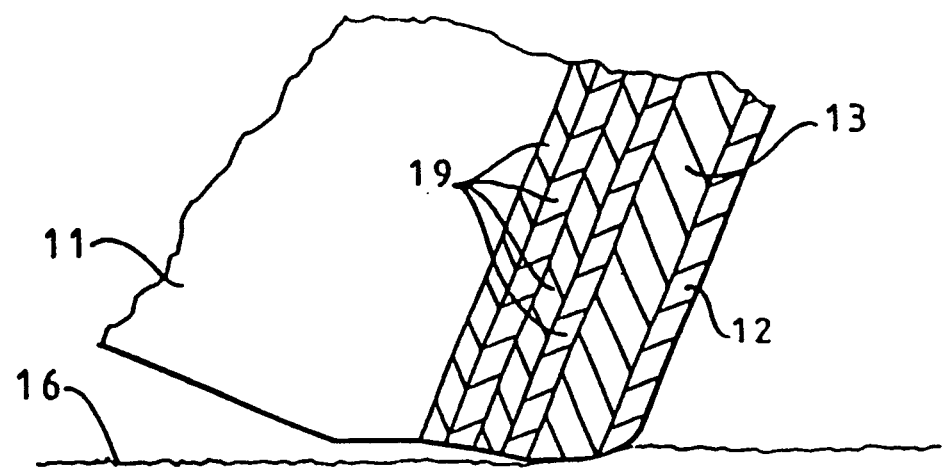
FIG. 5 is an enlarged detailed view of the embodiment of FIG. 4 after being partially worn in use.

FIG. 5 is an enlarged view of the cutting element shown in FIG. 4, in use and after a certain amount of wear of the cutting element has occurred. It will be seen that, as in the arrangement shown in FIG. 2, the front layer 12 has worn away to a rounded shape which enhances the anti-spalling effect. However, it will also be seen that the further layers 19 behind the second layer 13 have also worn away as they extend rearwardly of the layer 13, thus providing clearance between the formation 16 and both the cutting table and the substrate 11 to the rear of the layer 13, thus enhancing the self-sharpening effect.

Figure 6:
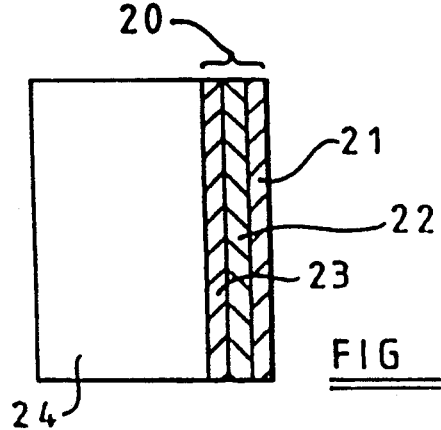
FIGS. 6–8 are additional views similar to that of FIG. 1 showing, respectively, additional embodiments of the invention.

FIG. 6 shows a cutting element of similar construction to the element shown in FIG. 3 in which the cutting table 20 comprises a front diamond layer 21, a second diamond layer 22, a third diamond layer 23 and a substrate 24 of cemented tungsten carbide. In accordance with the invention the front layer 21 is of less wear-resistance than the second layer 22, using any of the methods referred to, to provide the desirable anti-spalling effect. In the arrangement of FIG. 6, however, the third layer 23 is of greater wear-resistance than the second layer 22. In such an arrangement the resultant rounding of the cutting edge which occurs after some use of the cutting element may extend over both the front layer 21 and the second layer 22, since these are both less wear-resistant than the third layer 23.

Figure 7:
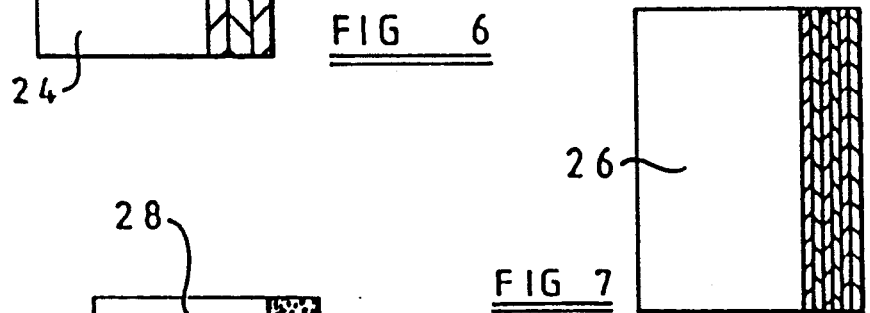

A further development of the type of cutting element shown in FIG. 6 is shown in FIG. 7. In this case there are a plurality of diamond layers 25 making up the cutter table, the layers being bonded to one another and the rearmost layer being bonded to the substrate 26. Each layer is less wear resistant than the one behind it. In use, rounding of the layers of the cutting table will be spread over all those layers which are in front of the layer which, for the time being, is bearing against the formation.

In the arrangements shown in FIGS. 6 and 7 the layers are of essentially the same thickness but they may also be of different thicknesses and it will be appreciated that the profile shape of the resultant rounding will depend to a certain extent on the relative thickness of the layers, as well as their relative wear-resistance.

In the arrangements of FIGS. 6 and 7, transition layers of diamond may also be provided between the rearmost of the layers shown and the substrate.

Figure 8:
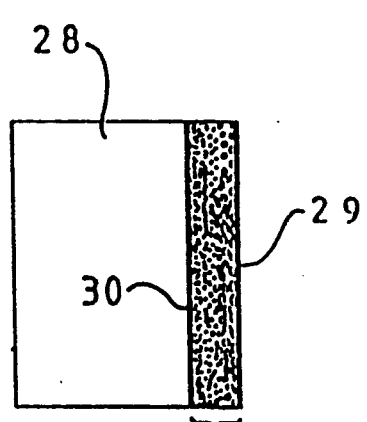

In the arrangements so far described, the different portions of the superhard cutting table are in the form of discrete layers which are formed in the press, preferably simultaneously, when the cutting element is formed, the composition of each layer being substantially uniform (as hereinbefore defined). However, as shown in FIG. 8, it is also possible for the cutting table to comprise a single non-uniform layer 27 of polycrystalline diamond, bonded to the substrate 28, the composition of the single layer 27 varying from its front cutting face 29 to its rear surface 30 where it is bonded to the substrate 28. The varying composition of the layer 27 between these surfaces may be so arranged, using any of the methods referred to earlier, that the wear-resistance of the layer increases continuously as it extends from the cutting face 29 towards the substrate 28. This may be achieved by (a) decreasing the particle size and/or (b) increasing the packing density and/or (c) decreasing the proportion of additive in the layer as it extends from the surface 29 towards the substrate. Such variation, and consequent increase in wear-resistance, may continue all the way up to the rear surface 30 where the diamond layer is bonded to the substrate. If desired a transition layer may be provided between the surface 30 and the substrate 28.

Alternatively, the arrangement may be such that the wear-resistance of the layer 27 increases up to an intermediate position away from the front face 29 whereafter the wear-resistance decreases again until the rear surface 30 is reached.

I claim:

1. A preform cutting element including a cutting table of superhard material having a front cutting face and a rear face, the rear face of the cutting table being bonded to a substrate of material which is less hard than the superhard material, wherein the cutting table comprises distinct layers of superhard material bonded together and including a front layer which provides said cutting face and a second layer behind said front layer, the front layer comprising a form of superhard material which is less wear-resistant than the superhard material forming the second layer, and a plurality of further layers stacked behind the second layer, the further layers being of reducing wear-resistance as they extend away from the second layer towards the substrate.

2. A preform cutting element including a cutting table of superhard material having a front cutting face and a rear face, the rear face of the cutting table being bonded to a substrate of material which is less hard than the superhard material, wherein the cutting table comprises distinct layers of superhard material bonded together and including a front layer which provides said cutting face and a second layer behind said front layer, the front layer comprising a form of superhard material which is less wear-resistant than the superhard material forming the second layer, and a third layer of superhard material behind the second layer and bonded thereto, the third layer being formed of a superhard material which is more wear-resistant still than the second layer.

3. A cutting element according to claim 2, wherein there is provided a plurality of layers stacked behind the second layer, the further layers being formed of increasingly wear-resistant superhard material as they extend away from the second layer.

4. A preform cutting element including a cutting table of superhard material having a front cutting face and a rear face, the rear face of the cutting table being bonded to a substrate of material which is less hard than the superhard material, wherein the cutting table comprises a single layer, the composition of the single cutting layer varying throughout its thickness in a manner so as to provide a front portion which is less wear-resistant than at least one other portion of the remainder of the single layer.

5. A preform cutting element including a cutting table of superhard material having a front cutting face and a rear face, the rear face of the cutting table being bonded to a substrate of material which is less hard than the superhard material, wherein the cutting table is formed of polycrystalline diamond, and a front portion of the cutting table is rendered less wear-resistant than at least one other portion of the remainder of the cutting table by being formed of diamond particles which are, on average, of larger grain size than the diamond particles forming other portions of the cutting table.

6. A preform cutting element including a cutting table of superhard material having a front cutting face and a rear face, the rear face of the cutting table being bonded to a substrate of material which is less hard than the superhard material, wherein the cutting table is formed of polycrystalline diamond, and a front portion of the cutting table is rendered less wear-resistant than at least one other portion of the remainder of the cutting table by being formed of diamond particles of lower packing density than the diamond particles forming other portions of the cutting table.

7. A preform cutting element including a cutting table of superhard material having a front cutting face and a rear face, the rear face of the cutting table being bonded to a substrate of material which is less hard than the superhard material wherein the cutting table is formed of polycrystalline diamond, and a front portion of the cutting table is rendered less wear-resistant than at least one other portion of the remainder of the cutting table by the inclusion of an additive material prior to formation of the cutting element in the press.

8. A cutting element according to claim 7, wherein the additive material is tungsten carbide particles or pre-cemented particles of tungsten carbide.

* * * * *